United States Patent Office 2,745,491
Patented May 15, 1956

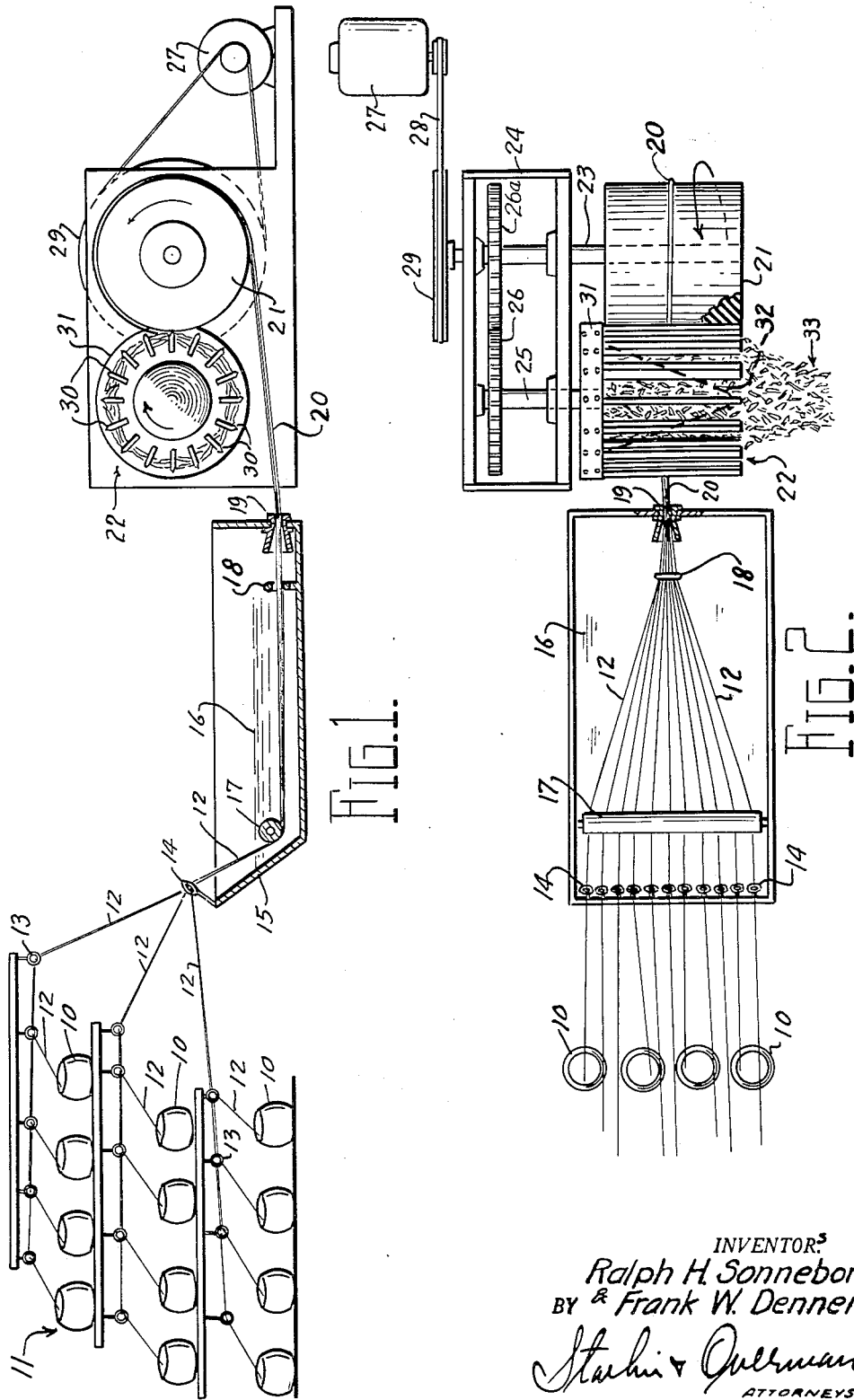

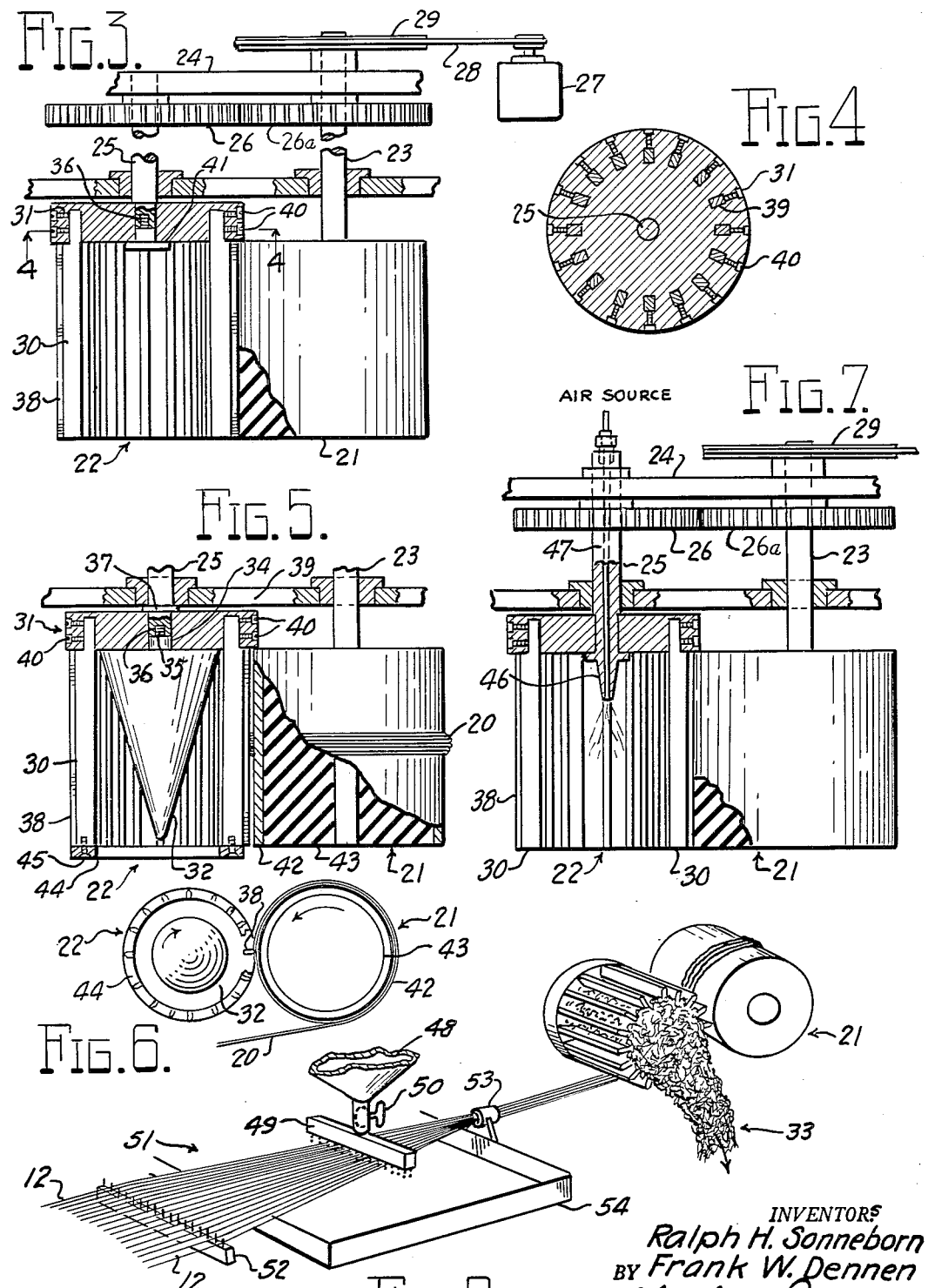

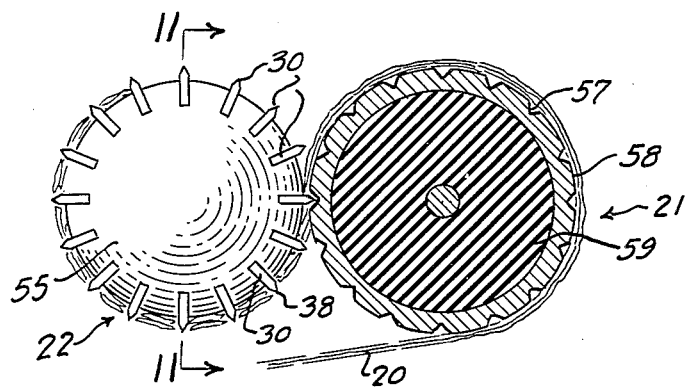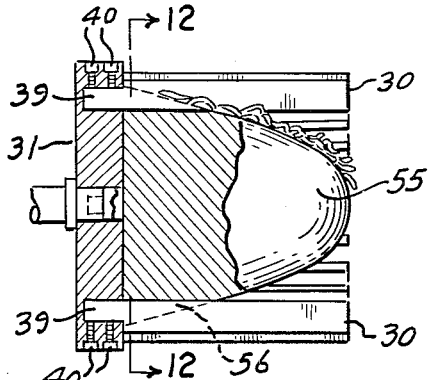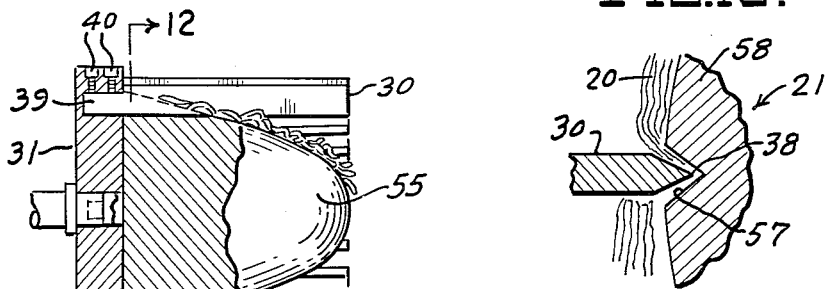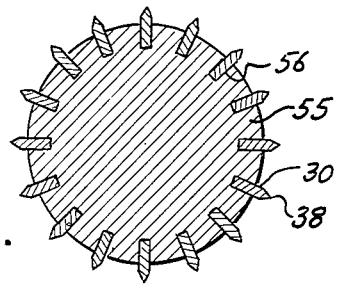

2,745,491
APPARATUS FOR THE PREPARATION OF GLASS FIBER REINFORCED MOLDING COMPOSITIONS

Ralph H. Sonneborn and Frank W. Dennen, Newark, Ohio, assignors to Owens-Corning Fiberglas Corporation, Toledo, Ohio, a corporation of Delaware Application May 16, 1952, Serial No. 288,358

3 Claims. (Cl. 164—61)

This invention relates to a process for the preparation of glass fiber reinforced resinous masses, as for example, a polyester resin molding composition reinforced by cut glass strands.

The invention contemplates assembling a plurality of continuous strands, each comprising a large number of individual glass filaments, coating the filaments continuously with resin in a pre-established and controlled glass-resin ratio to prepare a large sliver or bundle of resin coated glass strands and then cutting the strands into short lengths, for example, by continuously feeding the sliver through a high speed cutter, preferably one which also mats the cut coated strands together to permit further handling.

The invention includes several different procedures for performing the resin coating step and for controlling the glass-resin ratio and it further includes the concept of mechanism particularly effective for the cutting and matting steps to assemble the resinous mass for further operations.

The process of the invention produces a glass fiber reinforced resinous mass in which strand integrity is maintained and in which any desired glass to resin ratio can be provided.

In mixing processes of the prior art, liquid resin and cut glass fiber strands are mixed together either by adding the cut strands to a mass of resin or by gradually pouring the liquid resin into a container of cut glass strands and mechanically intermixing the two. The extensive mechanical working necessary to achieve thorough mixing of the glass and resin in such processes causes the individual fibers to be separated from each other and strand grouping is substantially destroyed.

In contrast, by the practice of the instant invention, because the strands are coated with the resin prior to cutting the strands into short sections and because there is relatively little mechanical working of the resin coated glass fiber strands, the strands are not separated into individual filaments but maintained their integrity as associated groups of individual fibers with all of the fibers in each group closely adhered by the resinous mass. The resulting molding compound produces molded articles of higher strengths than is the case when extensive mechanical working and the resulting separation of the fibers within a strand result from the mixing step.

Illustrative methods embodying the invention will be more fully understood from the specification which follows and from the drawings which illustrate the carrying out of the method embodying the invention on various forms of apparatus and, in particular, illustrate the use of a cutter specifically designed for the practice of the invention and in itself constituting a portion of the invention.

In these drawings:

Fig. 1 is a somewhat diagrammatic view in side elevation and partly in section of apparatus assembled for carrying out the process of the instant invention.

Fig. 2 is a plan view of the apparatus shown in Fig. 1.

Fig. 3 is a vertical sectional view on an enlarged scale of a modification of the cutter shown in Fig. 2 and illustrating how the mass of resin coated glass fiber strand sections can be removed from the cutter by reliance upon the force of gravity instead of by a mechanical provision.

Fig. 4 is a detailed sectional view taken substantially on the line 4—4 of Fig. 3 and illustrating the method of mounting for the individual cutting knives as employed in the structure shown in both Figs. 2 and 3.

Fig. 5 is a horizontal sectional view of a further modification of the cutter mechanism and illustrating the operation of a slightly modified method embodying the invention.

Fig. 6 is an end view in elevation and on a slightly reduced scale of the cutter mechanism shown in Fig. 5 and illustrating a slightly modified method.

Fig. 7 is a view similar to Fig. 5 but of a further modification of the cutter mechanism and illustrating the employment of an air blast in place of the mechanical actuation provided by the apparatus of Fig. 5 or the gravity actuation provided by the apparatus of Fig. 3.

Fig. 8 is a fragmentary somewhat diagrammatic view in perspective of apparatus designed for the carrying out of the process embodying the invention and specifically illustrating a different glass fiber strand coating step.

Fig. 9 is a view similar to Fig. 6, but on a larger scale, of a cutter roller embodying a modification of the invention.

Fig. 10 is a greatly enlarged fragmentary view of portions of the cutting elements embodied in the structure shown in Fig. 9.

Fig. 11 is a vertical sectional view taken substantially on the line 11—11 of Fig. 9.

Fig. 12 is a transverse vertical sectional view taken on the line 12—12 of Fig. 11.

In carrying out the process of the instant invention a plurality of spools or packages 10 of glass fiber strands are assembled in a creel, generally indicated at 11. A strand 12 from each of the spools 10 is led upwardly and through one of a plurality of guiding and gathering eyes 13 and then all of the strands 12 are guided downwardly through a battery of horizontally spaced guiding eyes 14. The guiding eyes 14 are mounted, for example, at one end of a resin containing tank 15 in which a quantity of appropriate resin 16, for example polyester resin, is maintained. The strands 12 are led beneath a holddown roller 17 at the near side of the tank 15, along the bottom of the tank, through a gathering eye 18 and then through a generally funnel shaped forming and compacting die 19 which is located in the end of the tank beneath the level of the resin 16.

The gathering eye 18 causes the strands 12 to compact together into a generally tubular structure with resin in the interior thereof. Excess resin carried by the tubular structure of strands is squeezed backwardly and outwardly between the individual strands as the "tube" of strands is reduced in diameter by the die 19 and progresses therethrough. The resulting sliver or bundle 20 consists of compacted strands arranged closely adjacent each other in parallel relationship with each individual strand coated with a thin layer of resin and the interstices between the strands filled with the resin. By appropriately dimensioning and shaping the die 19, depending upon the speed of operation, the viscosity and tackiness of the resin, the diameter of the individual strands and of the finished sliver, and similar considerations, the correct resin-to-reinforcing-fiber ratio can be maintained with a high order of accuracy so that the assembled sliver 20 is appropriately balanced for subsequent molding.

The sliver 20 is led beneath and around a drum 21 which is rotated at a high rate of speed in a counterclockwise direction (Fig. 1) and carried by the drum 21 up and around between the bite of the drum and a cutter roller of the same external diameter generally indicated at 22. The drum 21 is mounted upon a shaft 23 supported in a journal box 24 parallel to a shaft 25 also supported in the box 24 and on which the roller 22 is mounted.

Meshed spur gears 26 and 26a on the shafts 23 and 25 transmit power to the shaft 25 from the shaft 23 which may be driven, for example, by a motor 27 through the medium of a belt 28 and pulley 29 secured on the shaft 23.

The function of the cutter roller 22 is to chop or cut the resin coated sliver 20 into short lengths determined by the circumferential distance between adjacent ones of a plurality of spaced, axially extending knives 30 which are mounted in a common hub 31 and which constitute the structural elements of the cutter roller 22. As the roller 22 rotates, the axially extending sharp edges of the knives 30 are swept in against the surface of the drum 21, severing the resin coated tow 20. The two spur gears 26 and 26a have different numbers of teeth in order to prevent the knives 30 from repeatedly registering on the same places on the periphery of the drum 21 which would cut grooves in its surface. Subsequently cut lengths of the strands squeeze the previously severed short lengths of viscid, tacky strand radially inwardly between the knives 30. The cutter roller 22 is provided with a coaxially located cone 32 which fills a considerable portion of the space in the interior of the spaced knives 30, having its larger diameter at the hub end of the cutter roller 22 and its point extending toward the opposite end thereof.

The squeezing action of following lengths of the sliver 20, as they are cut and forced between the spaced knives 30, gradually "extrudes" a mass 33 of short lengths of resin coated strands from the open end of the cutter roller 22.

The cone 32 (see also Fig. 5) is mounted on the cutter hub 31 coaxially therewith with its end of larger diameter at the hub end of the cutter roller 22. For example, the cone 32 may have an axially extending stub shaft 34 provided with a further extending screw 35 which is threaded into a socket 36 in the end of the cutter roller shaft 25. Tightening the screw 35 in the socket 36 serves not only to fix the cone 32 in place but also to tighten the cutter hub 31 against a shoulder 37 on the shaft 25.

The pointed end of the cone 32 extends toward and between the free ends of the cutter knives 30, each of which has a sharp edge 38 that is turned radially outward. Each of the knives 30 has a rectangular shank 39 (see also Fig. 4) that is socketed in the cutter hub 31 and secured therein by a pair of axially spaced radially extending set screws 40.

In each of the several embodiments of the cutter which are illustrated in the drawings, sixteen of the knives 30 are shown, but this number, of course, varies, depending upon the desired length of each of the cut sections of the coated strand. If it is desired that the lengths be longer, fewer knives are employed in the cutter and vice versa. Depending also on the particular form of cutter being employed, the radial cutting edges 38 of the knives 30 may or may not make contact with the surface of the feeding drum 21. In the embodiments of the invention illustrated in Figs. 2, 3 and 7, such peripheral contact is maintained but in the embodiment of Figs. 5 and 6 the shafts 23 and 25 are spaced slightly farther apart and the peripheries of the feeding drum 21 and roller 22 are not in engagement. The reason for this spacing will be further described below.

In the embodiment of the cutter illustrated as being employed in Fig. 2 individual severed sections of coated strand are cut by successive knives and gradually forced radially inwardly between the knives 30 as shown best in Fig. 1. After a substantial quantity of coated sections has been cut the coated sections fill the generally annular space between the inner edges of the cutting knives 30 and the surface of the cone 32. Upon subsequent cutting these cut coated sections are displaced axially along the surface of the cone 32 toward the open end of the cutter and "extruded" from the open end in the form of a generally homogeneous viscous mass 33 which can be handled and divided into appropriate weighed or otherwise measured charges for subsequent molding operations.

The movement of the tacky mass 33 is facilitated by fabricating the cone 32 from material having a highly polished surface, for example, a bright chromium plated surface, a polished stainless steel, or a smooth surface resinous material.

Where the mass is less tacky and thus flows with more freedom, or where other considerations make it more desirable, the mass of coated strand sections may be extruded from the cutter roller 22 by the force of gravity alone. An arrangement facilitating such an operation is shown in Fig. 3. In the cutter illustrated in Fig. 3 the two shafts 23 and 25 are vertical with the drum 21 and roller 22 extending downwardly therefrom. The cutter hub 31 in which the knives 30 are mounted is secured on its shaft 25 by a retainer 41 which is threaded into the socket 36 in the shaft 25 fixing the hub 31 thereon. In this modification of the cutter the feeding drum 21, as in the modification illustrated in Figs. 1 and 2, is fabricated from a resilient material, for example natural or synthetic rubber and the sharp edges 38 of the knives 30 make direct contact with the periphery of the drum 21.

In the modification of the cutter illustrated in Figs. 5 and 6 a slight modification in the process also is illustrated. In this structure an extruding cone 32 is shown and the shafts 25 and 23 are shown as extending horizontally. As in the case of the modification shown in Fig. 3, the direction of extension of the shafts 23 and 25 depends upon structural desires and upon the consistency of the mass to be extruded and similar characteristics, the direction of the shafts being not critical to the process embodying the invention or to the modification illustrated in Figs. 5 and 6. In this modification, however, the edges 38 of the knives 30 do not contact the periphery of the drum 21 and the drum is shown as having a "tire" or peripheral surface 42 fabricated from, for example, bronze or similar material mounted on a rubber drum 43 in turn secured on the shaft 23. In practicing the process of the invention with the use of a cutter constructed according to the showings of Figs. 5 and 6, the coated sliver 20 is led around the drum 21 and allowed to wrap on the drum 21 as it rotates, building up a multilayer wrapping which eventually fills the space between the periphery of the tire 42 and the edges 38 of the knives 30. When the space is filled, the edges 30 cut through successive coated strands severing them into short sections which lie between the successive ones of the knives 30. The cut sections are gradually forced inwardly and extruded by the cone 32, for example, from the open end of the cutter roller 22.

In Figs. 5 and 6 there also is shown a knife bracing ring 44 which is fixed on the free ends of the knives 30 by set screws 45 to strengthen the group of knives as a whole and to prevent their flexing inwardly due to the pressure exerted thereon by the cutting action. Although the bracing ring 44 is shown in conjunction with the structure of Figs. 5 and 6 in which multiple strands may be cut as they build up on the surface of the drum 21, the structure is in no way thus limited and it may not be necessary to employ the bracing ring even where multiple strands are being cut; these two changes or modifications being illustrated in the same figure principally for conservation of space.

In the modification of the cutter structure which is illustrated in Fig. 7 of the drawings the drum 21 may either be of rubber as is actually shown or, if desired, it may have a metallic tire or peripheral surface and it may either be spaced to contact the edges 38 of the knives 30 or to provide a space therebetween in which the coated sliver 20 can build up as illustrated in Figs. 5 and 6.

The change between the structure shown in Fig. 7 and that of the other drawings is in the method of removing the cut sections of coated strand material from the interior of the cutter roller 22. In the modification of Fig. 7 the shafts 25 and 23 again are illustrated as extending horizontally. In place of the extruding cone 32 the cutter of Fig. 7 is provided with an air jet 46 mounted coaxially with the roller 22 and fed from an air source through an opening 47 in the shaft 25. The blast of air emanating from the jet 46 successively forces the cut coated strand sections from the open end of the roller 22 particularly where the mass is lighter and less viscous.

In Fig. 8 there is illustrated apparatus for the practice of a modified process incorporating a cutter of the type disclosed, for example, in Figs. 5 and 6.

In operating the apparatus of Fig. 8 in accordance with the invention, resin is spread on the moving strands 12 from a resin supply tank 48 by a spreader 49 at a rate determined, for example, by a valve 50. In this operation the strands 12 are moved in a fan shape generally indicated by the reference number 51 by a guiding comb 52 and through a forming die 53 mounted at one side of a drip pan 54.

A desired glass-resin ratio is maintained by metering the rate of flow of resin out of the spreader 49 in relationship to the speed of travel of the strands 12. By appropriately maintaining the temperature of the resin in the tank 48, the setting of the valve 50 and the speed of travel of the strands 12 beneath the spreader 49, any desired glass-resin ratio can be accurately and continuously maintained.

In Figs. 9 and 10 there is illustrated a further modification of apparatus embodying the invention in which a cutter roller, again generally indicated by the reference character 22, has a plurality of axially extending knives 30 which are mounted in the hub 31 by means of radially extending set screws 40. This structure is similar to that shown in the other modifications of the invention. In the structure of Fig. 9, however, an extruding cone 55 (see also Figs. 11 and 12) has a base diameter larger than the diametrical distance between the inner edges of opposed ones of the knives 30 and has a corresponding number of radial slots 56 into which the shanks 39 of the knives extend and which serve to brace the knives. The larger extruding cone 55 of Figs. 9, 10 and 11 functions in the same manner as the extruding cone 32 of Figs. 5 and 6 and it may in some instances be desirable to have the cone 55 be less pointed, as well as of a greater base diameter, in the manner shown in Figs. 9 and 11.

Figs. 9 and 10 illustrate a further modification of a portion of the cutter embodying the invention wherein the cutting edges 38 of the knives 30 protrude beneath the line of the peripheral surface of a feeding drum 21, into axially extending V-grooves 57 cut in the outer surface of a metallic sleeve 58 mounted on a resilient body 59 of the feeding drum 21. In Figs. 9 and 10 it will be seen that as the mass of strands 20 progresses around the feeding drum 21 it eventually is engaged between one of the knives 30 and its corresponding V-groove 57 (see Fig. 10) where it is severed.

It is to be observed both in the modification of Figs. 9 and 10 and in the modification of Figs. 5 and 6, the two modifications where metallic surfaces are employed on the feeding drum 21, that provision is made in each instance for preventing actual contact between the cutting edges 38 of the knives 30 and the surfaces of the metal sleeve 42 of Fig. 5 or 58 of Fig. 9. This spacing between the edges 38 of the knives 30 and the metal on the feeding drum 21 is provided in order to prevent the cutting away of chips of metal from the surface of the feeding drum 21 which would be mixed into the resinous mass extruded from the cutter roller 22.

In the modifications of structure of the cutter roller 22 illustrated in Figs. 2, 3, 5, 7 and 9 the arrangements of the cutter roller 22 and feeding drum 21 are all within the contemplated scope of variation in the process embodying the invention and all are modifications of cutter mechanism which also is a portion of the invention. The selection of the particular structure to be employed in any particular operation depends upon considerations such as the glass-resin ratio and resulting viscosity of the mass 33, the speed of operation, the diameter of the coated sliver or bundle 20 and similar influencing factors.

By the practice of the instant inventions, glass-resin ratios much higher than possible heretofore can be maintained. For examples, it is possible to spread resin at a rate such that the finished strands might conceivably consist of as much as 99% glass and 1% resin or as little as 5% glass and 95% resin. Great flexibility in the glass-resin ratio thus can be continuously provided.

The principal features of a process embodying the invention are directed toward three objectives which are:

A. Any desired glass-resin ratio.

B. Substantial strand integrity with minimum separation of individual filaments resulting from the elimination of any appreciable mechanical working.

C. Provision of cut, coated, strand sections in an easily obtainable and workable form.

With these objectives, methods and apparatus embodying the invention are described in the claims which follow.

We claim:

1. Apparatus for cutting short lengths of fibers off the forward end of a group of strands of continuous fibers, said apparatus consisting of a rotary drum, a cutter roller mounted on an axis parallel to the axis of said drum, means for driving said drum and said roller in opposite directions, said cutter roller comprising a shaft, a disk-like hub mounted on said shaft, a plurality of knives mounted in said hub with the edges thereof turned radially outward and extending axially thereof, the edges of said knives lying along lines equal radial distances from the axis of said hub, the backs of said knives being diametrically spaced, and the spaces therebetween diametrically and circumferentially being in communication, with the space between the ends of said knives remote from said hub being unobstructed; the axes of said drum and said roller being so spaced that the edges of said knives and the surface of said drum contact each other during rotation and means in the space interiorly of said knives for inducing axial movement of the severed short lengths of fibers through such interior space toward the unobstructed remote end thereof.

2. Apparatus according to claim 1 in which the means in the space interiorly of said knives is a conical element having its base at the hub end of said knives and its apex directed toward the open unobstructed end of the space between said knives.

3. A high speed rotary cutter comprising a cylindrical hub, a plurality of individual knives mounted in said hub at one end with their edges extending radially outward and axially relative to said hub and the other ends of said knives being unsupported with the space radially inward thereof unobstructed, said knives having widths from edges to backs substantially less than a radius of said hub and being spaced circumferentially from each other, and an air jet mounted on said hub in the space between said knives and directed toward the ends of said knives remote from said hub.

References Cited in the file of this patent
UNITED STATES PATENTS

| | | |
|---|---|---|
| 47,604 | Phillips | May 2, 1865 |
| 152,646 | Kellberg | June 30, 1874 |
| 242,207 | Lyon et al. | May 31, 1881 |
| 1,110,238 | Spiegel | Sept. 8, 1914 |
| 1,581,236 | Speer | Apr. 20, 1926 |
| 2,010,078 | Hale | Aug. 6, 1935 |
| 2,026,533 | Haupt | Jan. 17, 1936 |
| 2,631,668 | Wicker | Mar. 17, 1953 |

OTHER REFERENCES

Ser. No. 318,663, Bitterli et al. (A. P. C.), published June 8, 1943.